(12) United States Patent
Nielsen-Cole

(10) Patent No.: US 11,592,136 B2
(45) Date of Patent: Feb. 28, 2023

(54) ADDITIVE MANUFACTURING TECHNIQUE FOR THIN-WALL PRESSURE VESSELS

(71) Applicant: Orbital Composites, Inc., San Jose, CA (US)

(72) Inventor: Cole Nielsen-Cole, San Jose, CA (US)

(73) Assignee: Orbital Composites, Inc., Campbell, CA (US)

( * ) Notice: Subject to any disclaimer, the term of this patent is extended or adjusted under 35 U.S.C. 154(b) by 0 days.

(21) Appl. No.: 17/246,515

(22) Filed: Apr. 30, 2021

(65) Prior Publication Data

US 2021/0341091 A1 Nov. 4, 2021

Related U.S. Application Data

(60) Provisional application No. 63/018,504, filed on Apr. 30, 2020.

(51) Int. Cl.
| | |
|---|---|
| *B32B 41/00* | (2006.01) |
| *F16L 55/163* | (2006.01) |
| *G05D 1/02* | (2020.01) |
| *B25J 11/00* | (2006.01) |
| *B25J 15/00* | (2006.01) |
| *B25J 5/00* | (2006.01) |
| *F16L 55/18* | (2006.01) |
| *G06T 7/00* | (2017.01) |
| *B25J 15/04* | (2006.01) |

(52) U.S. Cl.
CPC ............. *F16L 55/163* (2013.01); *B25J 5/007* (2013.01); *B25J 11/0075* (2013.01); *B25J 15/0019* (2013.01); *B25J 15/0416* (2013.01); *F16L 55/18* (2013.01); *G05D 1/0246* (2013.01); *G06T 7/0004* (2013.01); *G06T 2207/30108* (2013.01)

(58) Field of Classification Search
CPC ......... F16L 55/163; F16L 55/18; F16L 55/44; F16L 2101/16; F16L 55/1645; B25J 5/007; B25J 11/0075; B25J 15/0019; B25J 15/0416; G05D 1/0246; G06T 7/0004; G06T 2207/30108
USPC .................... 156/60, 64, 350, 351, 378, 379
See application file for complete search history.

(56) References Cited

U.S. PATENT DOCUMENTS

2016/0031155 A1* 2/2016 Tyler ...................... B29C 48/00 264/129

* cited by examiner

Primary Examiner — Michael N Orlando
Assistant Examiner — Joshel Rivera
(74) Attorney, Agent, or Firm — AdamantineIP

(57) ABSTRACT

A device for applying a layer of material within a thin-walled pressure vessel may include one or more maneuvering actuators configured to direct the device within the thin-walled pressure vessel, an applicator operatively coupled to the one or more maneuvering actuators, and a controller operatively coupled to the one or more maneuvering actuators and the applicator, the controller is configured to control the one or more maneuvering actuators and the applicator. The applicator may include an expander configured to apply pressure along a portion of an inner wall of the thin-walled pressure vessel, a receptacle configured to secure the material to the device and position the material along the inner wall of the thin-walled pressure vessel, and a bonder configured to bond the material along the inner wall of the thin-walled pressure vessel.

18 Claims, 6 Drawing Sheets

ADDITIVE MANUFACTURING TECHNIQUE FOR THIN-WALL PRESSURE VESSELS

FIELD

The present disclosure generally relates to additive manufacturing techniques, more specifically to a techniques for building or repairing thin-wall pressure vessels.

BACKGROUND

The inside and outside of many thin-walled pressure vessels are often inaccessible to humans. For example, natural gas pipelines are buried below the ground to avoid inadvertent collisions that could result in fire or explosions. At the same time, it is often too dangerous for humans to enter pipelines for inspections and repair. The inspection and repair of thin-walled pressure vessels inaccessible to human is arduous and costly. Moreover, repairs often include halting transportation of the fluid and evacuating the fluid from the thin-walled pressure vessels, which results in a delay in delivery of the fluid and potentially of drop in production. As such, a technique for inspecting and repairing inaccessible thin-walled pressure vessels is desired, particularly, in situ, while the thin-walled pressure vessels is filled with fluid or transporting the fluid.

BRIEF SUMMARY

The following presents a simplified summary of one or more examples in order to provide a basic understanding of such examples. This summary is not an extensive overview of all contemplated examples and is intended to neither identify key or critical elements of all examples nor delineate the scope of any or all examples. Its purpose is to present some concepts of one or more examples in a simplified form as a prelude to the more detailed description that is presented below.

In accordance with some examples, a device for applying material to a thin-walled pressure vessel, the device comprising: one or more maneuvering actuators configured to direct the device within the thin-walled pressure vessel; an applicator operatively coupled to the one or more maneuvering actuators, the applicator comprising: an expander operatively coupled to the one or more maneuvering actuators and configured to apply pressure along a portion of an inner wall of the thin-walled pressure vessel; and a receptacle configured to secure the material to the device and position the material along the inner wall of the thin-walled pressure vessel; and a controller operatively coupled to the one or more maneuvering actuators and the applicator, the controller is configured to control the one or more maneuvering actuators and the applicator.

In accordance with some examples, a method for applying a layer of material within a thin-walled pressure vessel, the method comprising: while maintaining a flow of fluid within the thin-walled pressure vessel: maneuvering a first material along a portion of an inner wall of the thin-walled pressure vessel; applying conformal pressure to the first material along the portion of the inner wall of the thin-walled pressure vessel; and while maintaining conformal pressure to the first material along the portion of the inner wall, maneuvering a second material along the first material; sandwiching the first material between the second material and the portion of the inner wall of the thin-walled pressure vessel; and hermetically bonding the first material and the second material to the inner wall of the thin-walled pressure vessel.

BRIEF DESCRIPTION OF THE FIGURES

For a better understanding of the various described aspects, reference should be made to the description below, in conjunction with the following figures in which like-referenced numerals refer to corresponding parts throughout the figures.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some examples, well-known structures and components are shown in block diagram form in order to avoid obscuring such concepts.

Examples of devices for hermetically sealing material to the inner wall of a thin-walled pressure vessel (e.g., pipe) will now be presented with reference to various elements of a devices and methods. These devices and methods will be described in the following detailed description and illustrated in the accompanying drawing by various blocks, components, steps, processes, algorithms, etc. (collectively referred to as "elements"). These elements may be implemented using hardware, electronic hardware, computer software, or any combination thereof. Whether such elements are implemented as hardware or software depends upon the particular application and design constraints imposed on the overall.

As described in this disclosure a fluid is any substance that continually deforms (e.g., flows) under an applied shear stress, or external force. Fluids includes phase of matter, liquids, gases and plasmas. Fluids are substances with zero shear modulus, or, in simpler terms, substances which cannot resist any shear force applied to them.

Thin-walled pressure vessels (e.g., pipes) store and transport fluids and can include pressure tanks, pipes, vacuum tubes, and the like. Inspecting a repairing thin-walled pressure vessels (e.g., pipes), particularly, pipelines buried below the ground, is cumbersome and costly as it often involves removing the surrounding earth that surrounds the pipe, halting transportation of the fluid, and evacuating the fluid from the pipe. Once the outside of the pipe is accessible, workers can begin to repair pipe by welding or gluing material (e.g., patch) on the outside of the pipe. This technique is beneficial to vacuum lines as pressure differential between the inner and out wall of the thin-walled pressure vessel (e.g., pipe) assists in holding the material in place.

Figure 1:
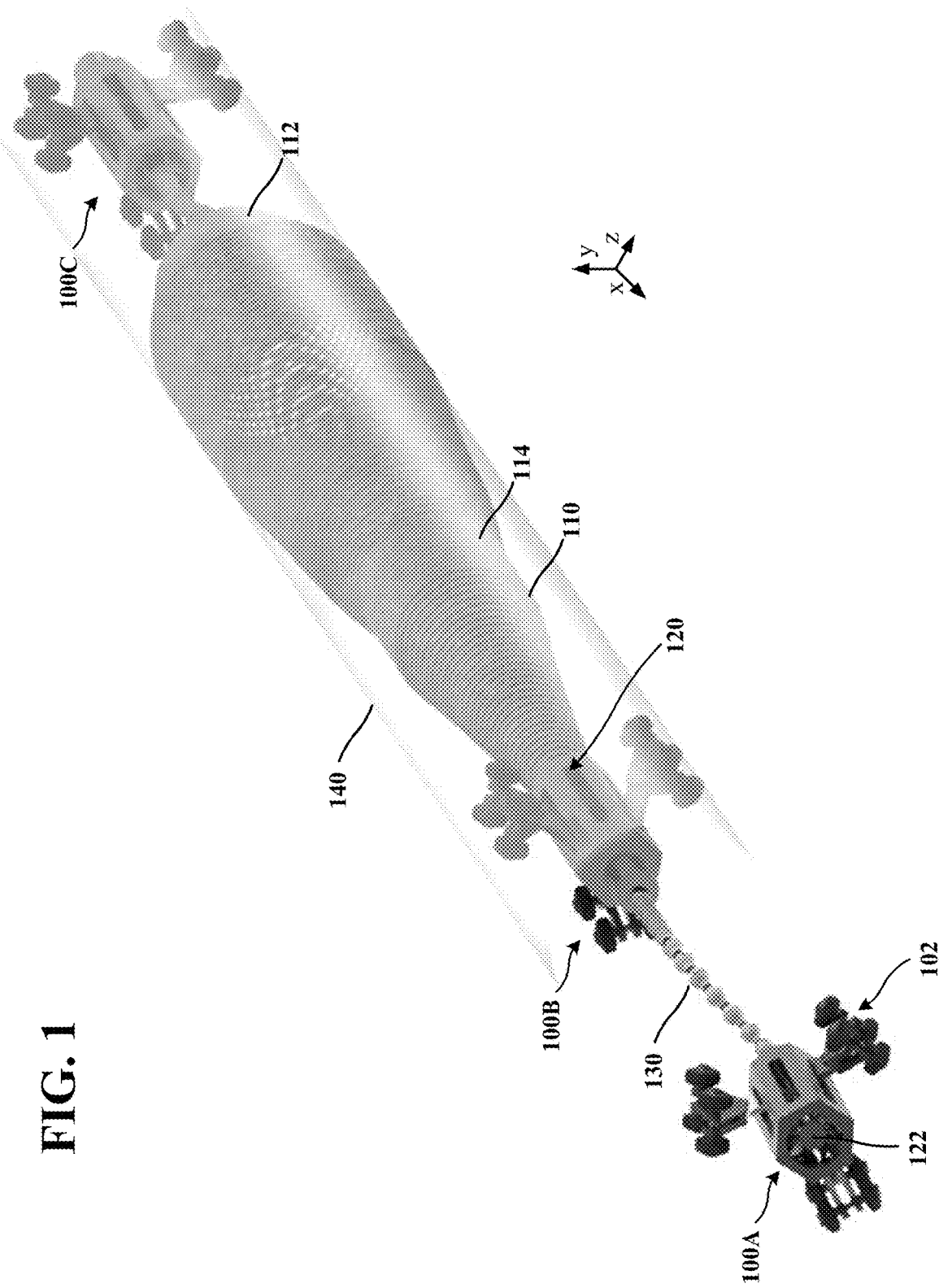
FIG. 1 illustrates an isometric view of three operatively coupled devices for applying material to the inner wall of a thin-walled pressure vessel.

It is contemplated that rather than repairing the outside of the a thin-wall pressure vessel (e.g., pipe), a device, such as a robot, can maneuver within a thin-wall pressure vessel and add material to a pipe in a manner that hermetically seals the pipe from the inside. This technique is facilitated by a pressure differential between the inner and out wall of the thin-walled pressure vessel (e.g., pipe) that assists in holding the material in place. FIG. 1 illustrates an isometric view of cascading three operatively coupled robots (e.g., first robot 100A, second robot 100B, third robot 100C) configured to apply material to an inner wall of a thin-walled pressure vessel (e.g., pipe).

Each the first robot 100A, the second robot 100B, and the third robot 100C include one or more maneuvering actuators 102 that are configured to direct each robot within the thin-walled pressure vessel (e.g., pipe). The one or more maneuvering actuators 102 depicted in FIG. 1, have axels that are positioned at 120° apart about the longitudinal direction of each respective robot (e.g., first robot 100A, second robot 100B, third robot 100C). In some examples, one or more of the maneuvering actuators 102 include a drive train configured to manipulate and move a respective cascaded robots (e.g., the first robot 100A, the second robot 100B, and the third robot 100C) in a direction along the thin-walled pressure vessel (e.g., pipe). The drive train can include a motor and one or more gears to turn traction wheels that are in contact with the inner wall of the thin-walled pressure vessel (e.g., pipe). In some examples, the drive train includes an axel with a differential when one or more traction wheel engage to compensate for different distances wheels travel when pivoted or turned. In some examples, the drive train includes an axel with a limited-slip differential. The limited-slip differential can engage two or more wheels of an axel to turn simultaneously to provide additional traction on the inner wall of the thin-walled pressure vessel (e.g., pipe).

In some examples, the one or more maneuvering actuators 102 can pivot and/or turn. The ability to pivot and/or turn facilitates positioning, and in some instances securing, the first robot 100A, the second robot 100B, and the third robot 100C within the thin-walled pressure vessel (e.g., pipe). In some examples, the one or more maneuvering actuators 102 pivot in the same direction. Pivoting in the same direction causes a respective cascaded robots (e.g., the first robot 100A, the second robot 100B, and the third robot 100C) to helically twist much like a screw within the thin-walled pressure vessel (e.g., pipe). Such maneuvering can facilitate application of an applicator 110 on the inner wall of the thin-walled pressure vessel (e.g., pipe). In some examples, the one or more maneuvering actuators 102 pivot in the different directions. Pivoting in the different direction effectively applies a "brake" to the position of the respective cascaded robots (e.g., the first robot 100A, the second robot 100B, and the third robot 100C). The "brake" secures a respective cascaded robots, the first robot 100A, the second robot 100B, and the third robot 100C), which aid in a fast flow or turbulent flow within thin-walled pressure vessel (e.g., pipe). In some examples, movement of the first robot 100A, the second robot 100B, and the third robot 100C can include a "brake" to the position of one or more of the respective first robot 100A, the second robot 100B, and the third robot 100C to replicate a worm-like or inch-worm-like motion.

As depicted in FIG. 1, the second robot 100B includes an applicator 110 operatively coupled to the one or more maneuvering actuators 102. The applicator 110 includes an expander 112 configured to apply pressure to the material along a portion of an inner-wall 140 of the thin-walled pressure vessel (e.g., pipe). In some examples, the expander 112 is an inflatable bladder (e.g., an inner tube, a balloon, etc.). In some examples, the expander 112 is an expandable helically wound braid (e.g., a Chinese finger puzzle, stent, and the like.) In the example depicted in FIG. 1 the applicator 110 is a segmented spring wound around a central axis with portions of the spring forming the expander 112 and configured to applying a pressure to the material along a portion of an inner-wall 140 of the thin-walled pressure vessel (e.g., pipe).

The applicator 110 also includes a receptacle 114 configured to secure the material to the second robot 100B and position the material along the inner-wall 140 of the thin-walled pressure vessel (e.g., pipe). In the example depicted in FIG. 1, a portion of the applicator 110 forms the receptacle 114 and is configured to secure the material to the second robot 100B for easy transport while the second robot 100B travels along the portion of the thin-walled pressure vessel (e.g., pipe). In some examples, the receptacle 114 includes a retractable covering (not depicted) that is configured to safeguard the material from inadvertent scuffing while the second robot 100B travels along the portion of the thin-walled pressure vessel (e.g., pipe). The retractable covering when deployed covers the material and when retracted exposes the material to the inner-wall 140 of the thin-walled pressure vessel (e.g., pipe).

The applicator 110 also includes a bonder configured to bond the material along the inner wall of the thin-walled pressure vessel (e.g., pipe). In the example depicted in FIG. 1, the applicator 110 includes a heating element (not depicted) that heats portions of the expander 112 to bond the material to the inner-wall 140 of the thin-walled pressure vessel (e.g., pipe). In some examples, the applicator 110 includes heating element that is temperature regulated. In some examples, the bonder is an ultra-violet light source that cures materials impregnated with a resin or ultra-violet light sensitive epoxy.

The second robot 100B further includes a controller (not depicted) operatively coupled to the one or more maneuvering actuators 102 and the applicator 110. The controller of FIG. 1, is a microprocessor with actuation motors configured to control the both the one or more maneuvering actuators 102 and the applicator 110. In particular, the microprocessor and actuation motors engages the motorized traction wheels on the axels for forward and reverse motion as well as changing direction along the annular space of the inner-wall 140. In some examples, the robots (e.g., first robot 100A, second robot 100B, third robot 100C) include one or more imaging capturing devices operatively coupled to the controller. The controller is configured to interpret captured images from the one or more imaging capturing devices (e.g., camera, infrared camera, etc.) and autonomously instruct the one or more maneuvering actuators 102 to adjust position of the device with the thin-walled pressure vessel (e.g., pipe). In some instances, the controller is configured to interpret captured images from the one or more imaging capturing devices for defects along the inner-wall 140 of the thin-walled pressure vessel (e.g., pipe).

Figure 2:
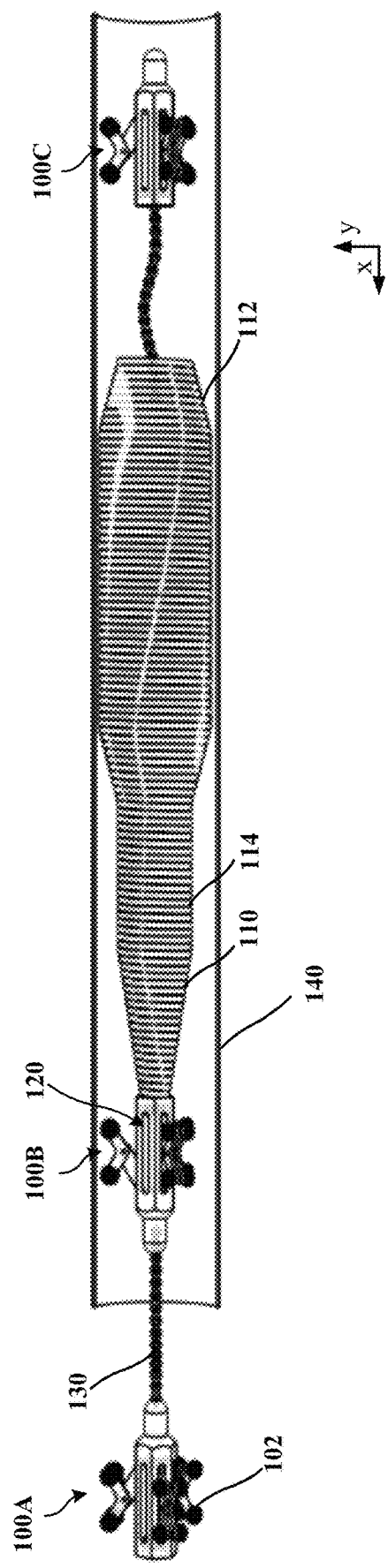
FIG. 2 illustrates a cross sectional view of three operatively coupled devices device for applying material to a thin-walled pressure vessel.

FIG. 2 illustrates a cross sectional view of three operatively coupled cascaded robots (e.g., first robot 100A, second robot 100B, third robot 100C) for applying material to a thin-walled pressure vessel. It should be appreciated that the first robot 100A, the second robot 100B, and the third robot 100C can each have the same configuration. That is, first robot 100A and the third robot 100C can also include the applicator 110 that includes an expander 112, receptacle 114, bonder, etc.

In some examples, the first robot 100A, the second robot 100B, and the third robot 100C are tethered using one or more couplers 130. In some examples, the one or more couplers 130 are mateable. In the example depicted in FIG. 1 and FIG. 2, the one or more couplers include multiple mateable ball and socket connection that provide limited adjustability for adequate flexibility within the thin-walled pressure vessel (e.g., pipe) when maneuvering in the twists and turns of a thin-walled pressure vessel (e.g., pipe) but are rigid enough to maintain position for ease of maneuvering with the thin-walled pressure vessel (e.g., pipe). In some examples, the one or more couplers 130 are configured to mechanically and/or electrically link between respective robots (e.g., first robot 100A, second robot 100B, third robot 100C).

Figure 3:
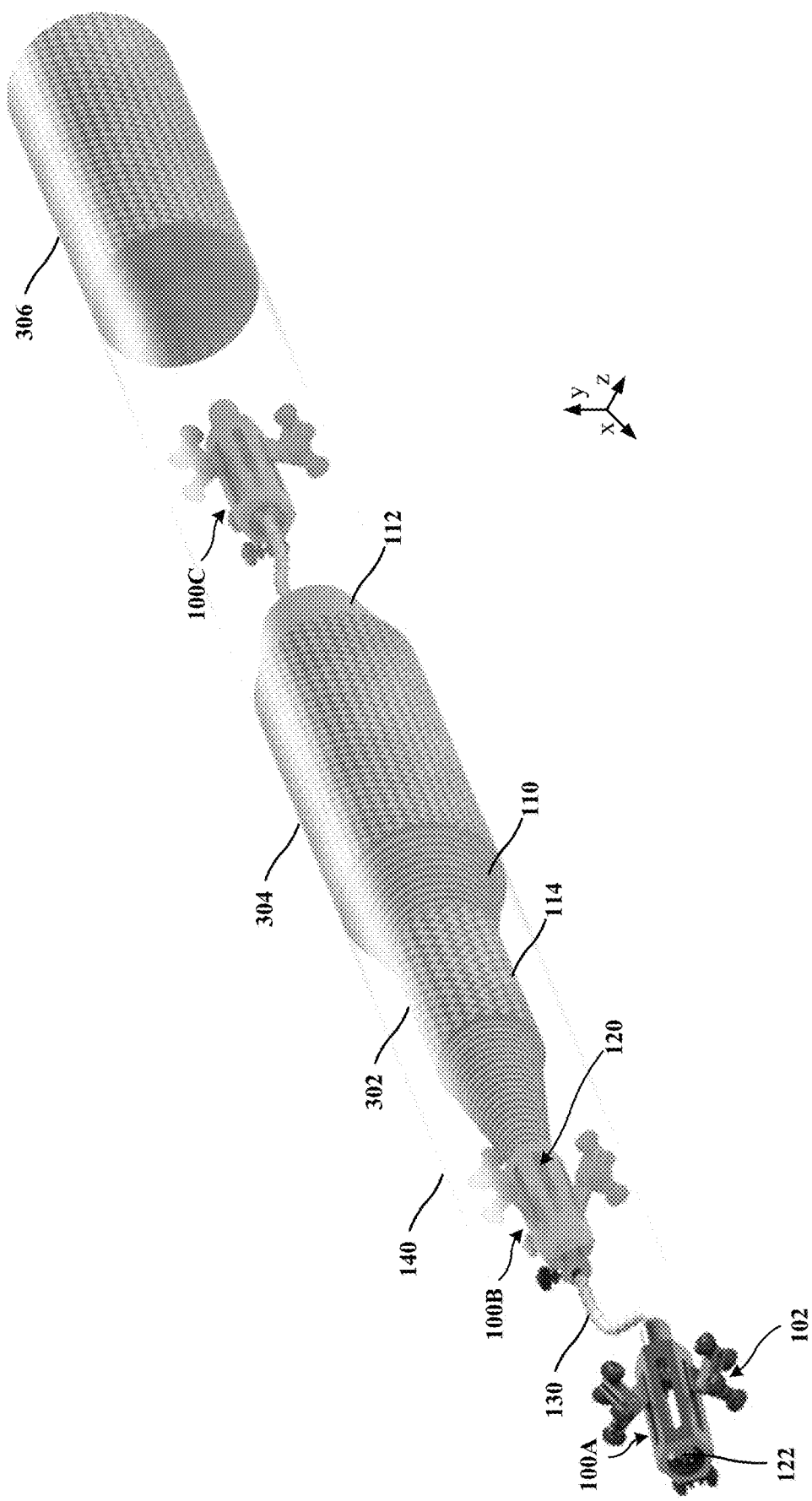
FIG. 3 illustrates an isometric view of three operatively coupled devices applying material to an inner wall of a thin-walled pressure vessel.

FIG. 3 illustrates an isometric view of three operatively coupled robots (e.g., first robot 100A, second robot 100B, third robot 100C) applying material to an inner wall of a thin-walled pressure vessel (e.g., pipe). In this example, material 306 has already been placed as a hermetic seal on the inner-wall 140 of a section of the thin-walled pressure vessel (e.g., pipe) and material 304 is a strong fibrous material (e.g., carbon fiber, fiber glass) that has already been positioned. The cascaded robots (e.g., first robot 100A, second robot 100B, third robot 100C) are shuttling the material 302 to position and sandwich the strong fibrous material (e.g., carbon fiber, fiber glass) in order to hermetically seal the portion of the inner-wall 140 of a section of the thin-walled pressure vessel (e.g., pipe) In some examples, the material 302 is a thermoplastic. In some examples, the material 302 is a ultra-violet curable resin or a ultra-violet curable epoxy. In some examples, one or both of the first material (e.g., material 304) and the second material (e.g., material 304) form an auxetic metamaterial (e.g., auxetic structures, auxetic materials) that expands when released from the applicator 110.

Figure 4:
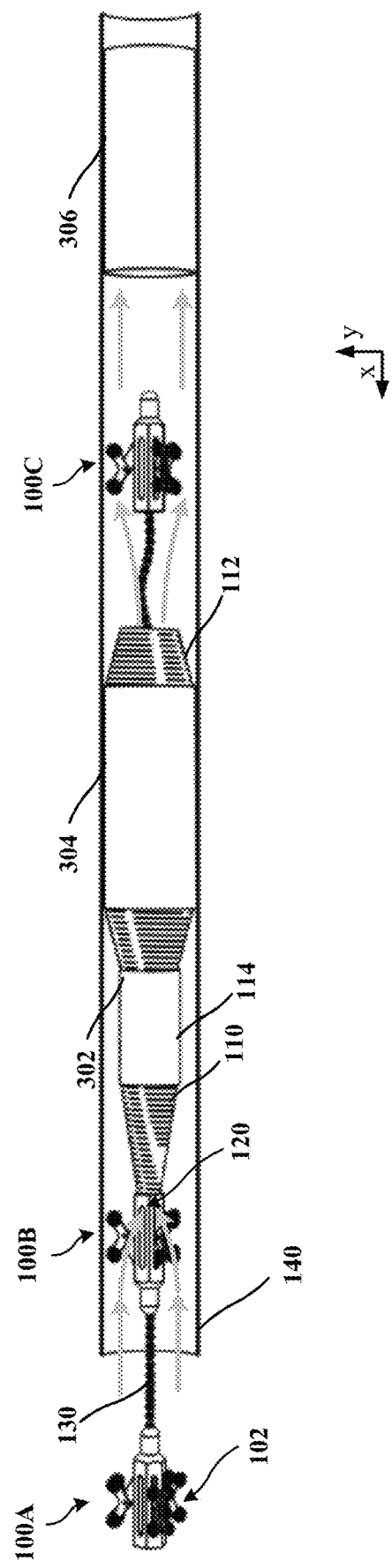
FIG. 4 illustrates a cross sectional view of three operatively coupled devices applying material to an inner wall of a thin-walled pressure vessel.

FIG. 4 illustrates a cross sectional view of three operatively coupled robots (e.g., first robot 100A, second robot 100B, third robot 100C) applying second material (e.g., material 302) to an inner-wall 140 of a thin-walled pressure vessel (e.g., pipe). It is contemplated that the cascaded robots (e.g., first robot 100A, second robot 100B, and third robot 100C) that are shuttling the material 302 are immersed in a fluid and that the fluid can be flowing (e.g., in transit). The one or more maneuvering actuators 102, the applicator 110 including the expander 112, the receptacle 114, the bonder, and materials (e.g., material 304, material 302) can impede the flow through the thin-walled pressure vessel (e.g., pipe). As depicted in FIG. 4 each respective robot (e.g., first robot 100A, second robot 100B, third robot 100C) includes a fluidic bypass 120 configured to increase the flow or redirect the flow of fluid around the each respective robot (e.g., first robot 100A, second robot 100B, third robot 100C) within the thin-walled pressure vessel (e.g., pipe). In some examples, the fluidic bypass includes a fluidic flow controller 122 (e.g., propeller) configured to maintain a rate of flow of the fluid around the respective robot (e.g., first robot 100A, second robot 100B, third robot 100C) within the thin-walled pressure vessel (e.g., pipe). In some examples, the fluidic bypass includes a fluidic flow controller 122 (e.g., propeller) configured to increase a rate of flow of the fluid around the respective robot (e.g., first robot 100A, second robot 100B, third robot 100C) within the thin-walled pressure vessel (e.g., pipe). In some examples, the fluidic bypass includes a fluidic flow controller 122 (e.g., propeller) configured to decrease a rate of flow of the fluid around the respective robot (e.g., first robot 100A, second robot 100B, third robot 100C) within the thin-walled pressure vessel (e.g., pipe). This assists to maintain consistent pressure when the robots (e.g., first robot 100A, second robot 100B, third robot 100C) are shuttling or applying a hermetic seal a portion of the inner-wall 140.

Figure 5:
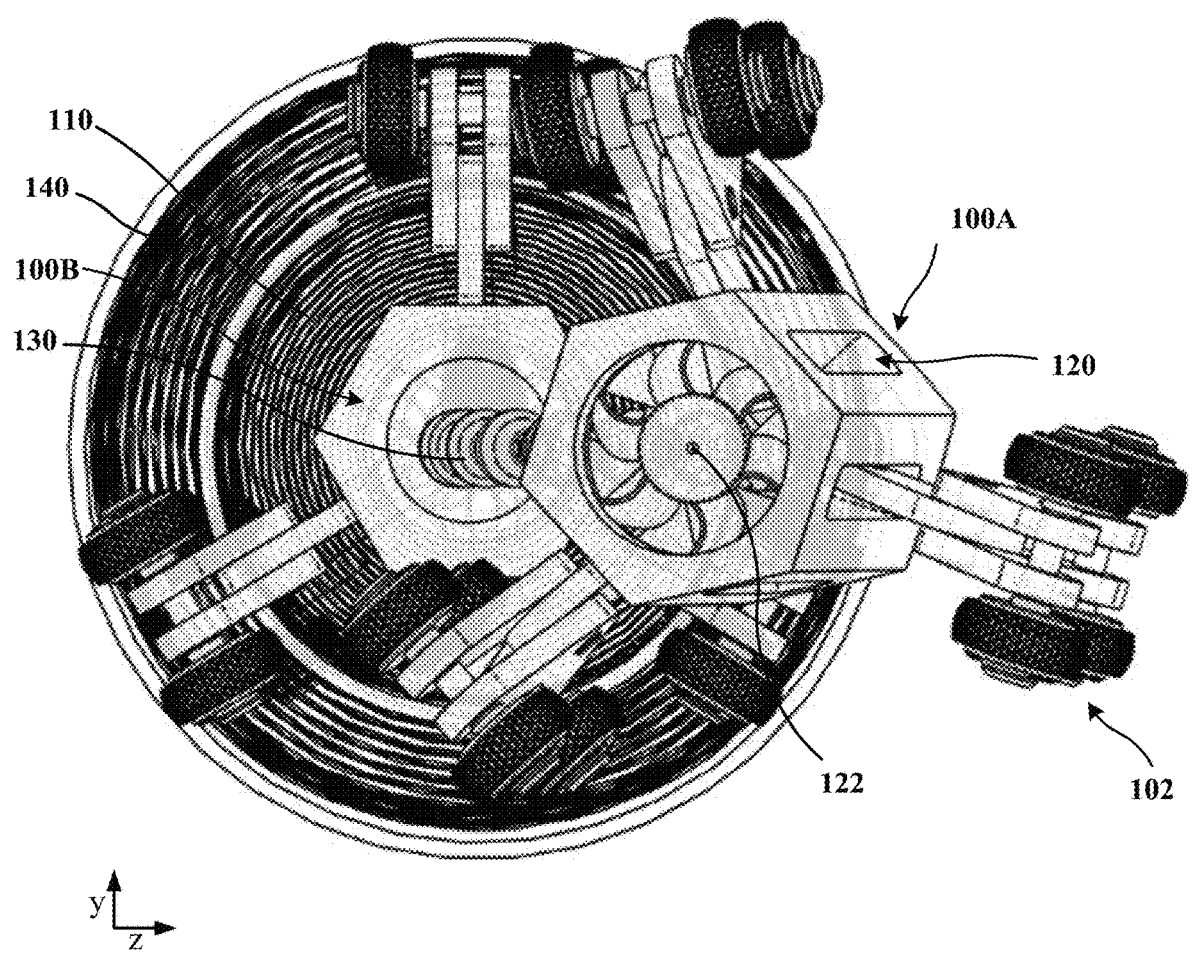
FIG. 5 illustrates an isometric view directed along an entrance of a thin-walled pressure vessel of two operatively coupled devices applying material to an inner wall of the thin-walled pressure vessel.

FIG. 5 illustrates an isometric view directed along an entrance of a thin-walled pressure vessel of two operatively coupled cascaded robots (e.g., first robot 100A and second robot 100B) applying material to an inner-wall 140 of the thin-walled pressure vessel. In this example, each axel includes motorized traction wheels that propel each respective robot (e.g., first robot 100A, second robot 100B, third robot 100C) along the annular space of the inner-wall 140. It contemplated that the one or more maneuvering actuators 102 can be configured as a tread (e.g., tank track, continuous track, etc.), rocker-boggie, and the like. It is contemplated that the axels can be retractable and/or adjustable to position the axel firmly to the inner-wall 140 of the a thin-walled pressure vessel (e.g., pipe). In some examples, the axels can be adjusted to be coaxial with the thin-walled pressure vessel (e.g., pipe). In some examples, the axels can be adjusted to be non-coaxial with the thin-walled pressure vessel (e.g., pipe). It is also contemplated that the one or more maneuvering actuators 102 include propellers or jet propulsion configured to propel the each respective robot (e.g., first robot 100A, second robot 100B, third robot 100C) within a fluid enclosed in the thin-walled pressure vessel (e.g., pipe). In some examples, the fluidic flow controller 122 (e.g., propeller) can assist or act as one of the one or more maneuvering actuators 102.

It is also contemplated that the cascaded robots (e.g., first robot 100A, second robot 100B, third robot 100C) can be tethered to a guide cable that pushes or pulls the cascaded robots (e.g., first robot 100A, second robot 100B, third robot 100C) through the thin-walled pressure vessel (e.g., pipe). In such instances, the guide cable can be operatively coupled to the controller such that rotation on the guide cable causes the controller to direct the one or more maneuvering actuators 102 to change direction within the thin-walled pressure vessel (e.g., pipe).

Figure 6:
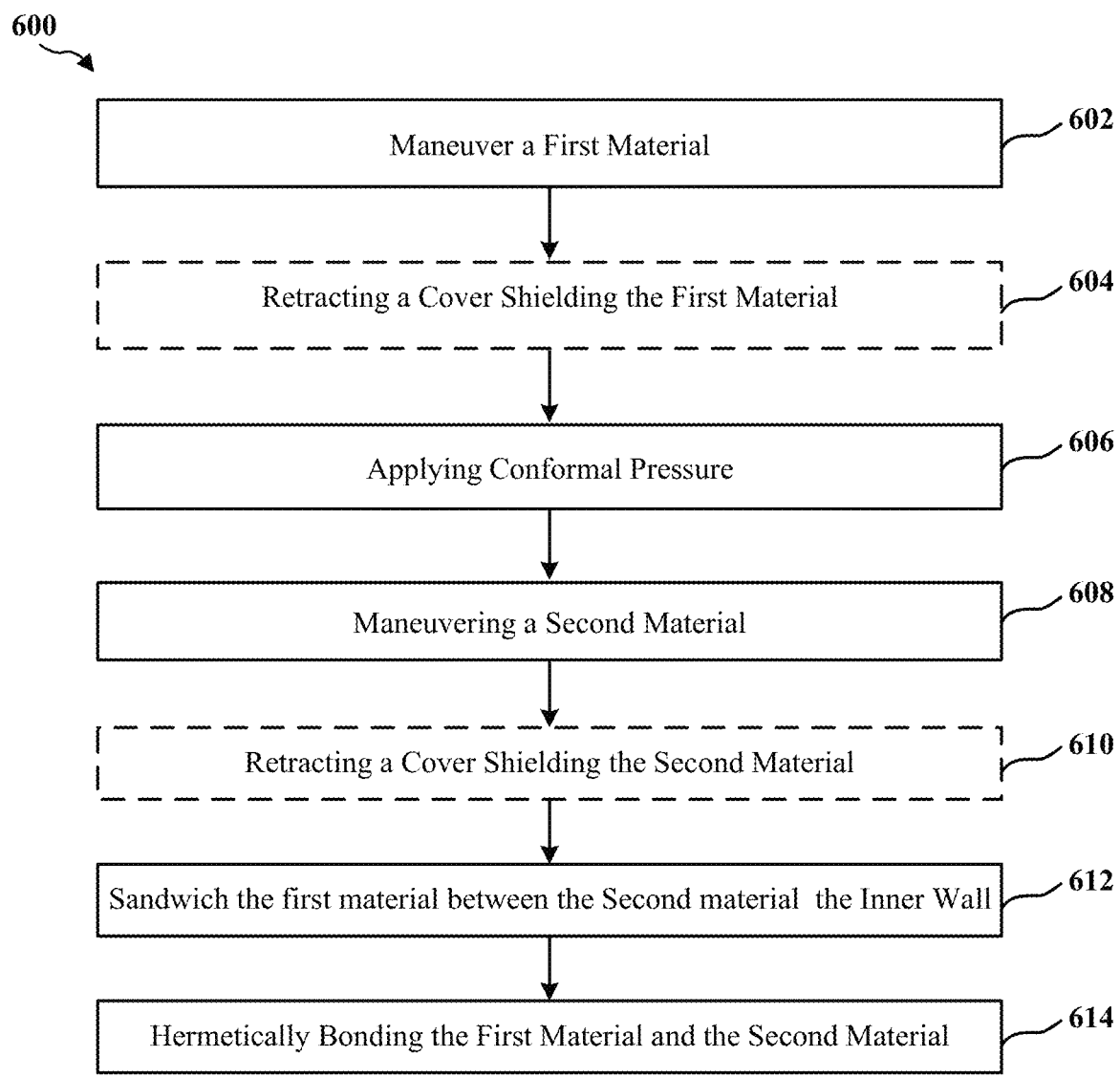
FIG. 6 is an exemplary flow diagram for hermetically sealing material to the inner wall of a thin-walled pressure vessel.

FIG. 6 is an exemplary flow diagram for hermetically sealing material to the inner-wall 140 of a thin-walled pressure vessel (e.g., pipe). At operation 602, process 600 maneuvers a first material (e.g., material 304) along a portion of an inner-wall 140 of the thin-walled pressure vessel (e.g., pipe). That is, once the second robot 100B is in position, the controller engages the actuator to expand the expander 112 (e.g., unwind the coiled spring, inflatable bladder, expand the stent, etc.) and manipulates the first material (e.g., material 304) from the receptacle 114 and positions the first material (e.g., material 304) along the inner-wall 140 of the thin-walled pressure vessel (e.g., pipe). In some examples, first material (e.g., material 304) is a thermoplastic or fibrous material.

At operation 604, process 600 optionally retracts a covering shielding the first material (e.g., material 304) along a portion of an inner wall of the thin-walled pressure vessel (e.g., pipe). The a receptacle 114 secures the material to the second robot 100B and in some examples, the receptacle 114 includes a retractable covering (not depicted) that is configured to safeguard the material from inadvertent scuffing while the second robot 100B travels along the portion of the thin-walled pressure vessel (e.g., pipe). The retractable covering when deployed covers the material and when retracted exposes the material to the inner-wall 140 of the thin-walled pressure vessel (e.g., pipe). In some examples, maneuvering the first material (e.g., material 304) along the portion of the inner wall of the thin-walled pressure vessel (e.g., pipe) includes retracting a cover shielding the first material (e.g., material 304).

At operation 606, process 600 applies pressure that conforms (e.g., conformal pressure) the first material (e.g., material 304) along the portion of the inner-wall 140 of the thin-walled pressure vessel (e.g., pipe). For example, once the controller and actuators unhooks the first material (e.g., material 304 from the receptacle 114, the expander 112 is engaged to apply pressure along a portion of an inner-wall 140 of the thin-walled pressure vessel (e.g., pipe). It should be appreciated that in some examples, the first material (e.g., material 304) forms an auxetic metamaterial (e.g., auxetic structure, auxetic material) that has a negative Poisson's ratio. When using the auxetic metamaterial (e.g., auxetic structure, auxetic material) the controller merely unhooks the first material (e.g., material 304) from the receptacle 114 and the first material (e.g., material 304) expands into place.

At operation 608, while maintaining conformal pressure to the first material (e.g., material 304) along the portion of the inner-wall 140 of the thin-walled pressure vessel (e.g., pipe), process 600 maneuvers a second material (e.g., material 302) along the first material (e.g., material 304). For example, FIG. 3 depicts the cascaded robots (e.g., first robot 100A, second robot 100B, and third robot 100C) shuttling the material 302 into position. Once the second robot 100B is in position, the controller engages the actuator to unwind the coiled spring and manipulates the second material (e.g., material 302) from the receptacle 114 and positions the second material (e.g., material 304) along the first material (e.g., material 304). In some examples, second material (e.g., material 302) is a thermoplastic or fibrous material.

In some examples, the second material (e.g., material 302) forms an auxetic metamaterial (e.g., auxetic structure, auxetic material). In some examples, both of the first material (e.g., material 304) and the second material (e.g., material 302) form an auxetic metamaterial (e.g., auxetic structure, auxetic material) that has a negative Poisson's ratio. In some examples, the second material (e.g., material 302) is a thermoplastic or fibrous material. In some examples, both of the first material (e.g., material 304) and the second material (e.g., material 302) is a thermoplastic or fibrous material.

At operation 610, process 600 optionally retracts a covering shielding the second material (e.g., material 302) along a portion of an inner-wall 140 of the thin-walled pressure vessel. For example, as part of maneuvering the second material (e.g., material 302) a retractable covering (not depicted) for the receptacle 114 is retracted to expose the second material (e.g., material 302) to the first material (e.g., material 304).

At operation 612, process 600 sandwiches the first material (e.g., material 304) between the second material (e.g., material 302) and the portion of the inner-wall 140 of the thin-walled pressure vessel (e.g., pipe). That is, the cascaded robots (e.g., first robot 100A, second robot 100B, third robot 100C) of FIG. 3 sandwiches the first material (e.g., material 304) between the second material (e.g., material 302) and the portion of the inner-wall 140 in order to hermetically seal the portion of the inner-wall 140 of a section of the thin-walled pressure vessel (e.g., pipe).

At operation 614, process 600 hermetically bonds the first material (e.g., material 304) and the second material (e.g., material 302) to the inner-wall 140 of the thin-walled pressure vessel (e.g., pipe). In the example depicted in FIG. 3, the first material (e.g., material 304) is a strong fibrous material (e.g., carbon fiber, fiber glass) and the second material (e.g., material 302) is a thermoplastic. In some examples, hermetically bonding includes heating the second material (e.g., material 302), while sandwiching the first material (e.g., material 304) between the second material (e.g., material 302) and the portion of the inner wall of the thin-walled pressure vessel (e.g., pipe). In some examples, hermetically bonding includes exposing a ultra-violet sensitive resin or ultra-violet sensitive epoxy to a ultra-violet light source bonder.

It is understood that the specific order or hierarchy of blocks in the processes and/or flowcharts disclosed is an illustration of exemplary approaches. Based upon design preferences, it is understood that the specific order or hierarchy of blocks in the processes and/or flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other examples. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various examples described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed under 35 U.S.C § 112(f) unless the element is expressly recited using the phrase "means for."

What is claimed is:

1. A device for applying material to a thin-walled pressure vessel, the device comprising:
   one or more maneuvering actuators configured to direct the device within the thin-walled pressure vessel;
   an applicator operatively coupled to the one or more maneuvering actuators, the applicator comprising:
      an expander operatively coupled to the one or more maneuvering actuators and configured to apply pressure to the material along a portion of an inner wall of the thin-walled pressure vessel; and
      a receptacle configured to secure the material to the device and position the material along the inner wall of the thin-walled pressure vessel;
   a fluidic bypass configured to direct a flow of a fluid around the applicator of the device within the thin-walled pressure vessel, and
   a controller operatively coupled to the one or more maneuvering actuators and the applicator, the controller is configured to control the one or more maneuvering actuators and the applicator.

2. The device of claim 1, wherein the applicator further includes a bonder configured to bond the material along the inner wall of the thin-walled pressure vessel.

3. The device of claim 1, wherein the applicator includes a temperature regulated heating element.

4. The device of claim 2, wherein the expander is translucent and the bonder is an ultra-violet light source.

5. The device of claim 1, wherein the fluidic bypass is configured to increase, decrease, or maintain the flow of the fluid around the device within the thin-walled pressure vessel.

6. The device of claim 1, wherein the fluidic bypass includes a fluidic flow controller configured to vary a rate of flow of the fluid around the device within the thin-walled pressure vessel.

7. The device of claim 1, wherein the expander is one of an coiled spring, an inflatable bladder, or an expandable helically wound braid.

8. The device of claim 1, further comprising:
   a cable connected to the controller and the one or more maneuvering actuators, wherein the cable is configured push or pull the device within the thin-walled pressure vessel and wherein torsional inputs of the cable to the controller directs the one or more maneuvering actuators to change direction within the thin-walled pressure vessel.

9. The device of claim 1, wherein the receptacle includes a retractable covering configured to safeguard the material when deployed and expose the material when retracted.

10. The device of claim 1, further comprising:
    one or more couplers connected to the one or more maneuvering actuators, wherein the couplers are configured to mechanically link the device to one or more maneuvering actuators of a second device.

11. The device of claim 10, wherein the one or more couplers are configured to electrically link the device to the one or more maneuvering actuators of the second device.

12. The device of claim 10, wherein the one or more couplers include a mateable ball and socket connection.

13. The device of claim 1, further comprising:
    one or more imaging capturing devices operatively coupled to the controller, and wherein the controller is configured to interpret captured images from the one or more imaging capturing devices and autonomously instruct the one or more maneuvering actuators to adjust position of the device within the thin-walled pressure vessel.

14. The device of claim 1, further comprising:
    one or more imaging capturing devices operatively coupled to the controller, and wherein the controller is configured to interpret captured images from the one or more imaging capturing devices for defects along the inner wall of the thin-walled pressure vessel.

15. The device of claim 1, wherein the fluid is enclosed within the thin-walled pressure vessel and wherein the fluid within the thin-walled pressure vessel is different from fluid outside the thin-walled pressure.

16. The device of claim 1, wherein the material is an auxetic metamaterial.

17. The device of claim 1, wherein structure of the material is an auxetic structure.

18. A device for applying material to a thin-walled pressure vessel, the device comprising:
    one or more maneuvering actuators configured to direct the device within the thin-walled pressure vessel;
    an applicator operatively coupled to the one or more maneuvering actuators, the applicator comprising:
       an expander operatively coupled to the one or more maneuvering actuators and configured to detach an auto-expanding auxetic metamaterial from the device; and
       a receptacle configured to position the auto-expanding auxetic metamaterial along the inner wall of the thin-walled pressure vessel; and
    a controller operatively coupled to the one or more maneuvering actuators and the applicator, the controller is configured to control the one or more maneuvering actuators and the applicator.

* * * * *